United States Patent [19]

Kawada

[11] Patent Number: 5,299,491

[45] Date of Patent: Apr. 5, 1994

[54] BEVERAGE EXTRACTING APPARATUS FOR VENDING MACHINES

[75] Inventor: Kazuki Kawada, Isesaki, Japan

[73] Assignee: Sanden Corporation, Japan

[21] Appl. No.: 59,272

[22] Filed: May 11, 1993

[30] Foreign Application Priority Data

May 11, 1992 [JP] Japan .................... 4-030598[U]

[51] Int. Cl.[5] .......................................... A47J 31/32
[52] U.S. Cl. ............................. 99/289 T; 99/302 R
[58] Field of Search ........... 99/289 T, 289 R, 289 D, 99/289 P, 279, 286, 292, 300, 302 R; 426/433

[56] References Cited

U.S. PATENT DOCUMENTS 3,213,777 10/1965 Heier .
4,506,596 3/1985 Shigenobu et al. .
4,791,859 12/1988 King ................................ 99/289 T
4,984,511 1/1991 Sekiguchi .
4,998,462 3/1991 Sekiguchi .
5,127,317 7/1992 Takayanagi ..................... 99/289 T

FOREIGN PATENT DOCUMENTS 62-211800 9/1987 Japan .

Primary Examiner—Robert W. Jenkins
Attorney, Agent, or Firm—Banner, Birch, McKie & Beckett

[57] ABSTRACT

A beverage extracting apparatus for vending machines includes a cylinder for storing a liquid mixture of water and raw material of a beverage, a valve opening and closing the inflow port of the cylinder, a rolled filter paper covering the bottom opening of the cylinder, a filter support vertically moved to open and close the bottom opening of the cylinder via the filter paper, and an air pump supplying pressurized air into the cylinder to forcibly filtrate the liquid mixture stored in the cylinder via the filter paper. The rolled filter paper is advanced at an appropriate interval onto the filter support by the cooperative rotational motion of a pair of first driving rollers and a pair of corresponding idler rollers. Each of the pair of idler rollers is rotatably supported by a separate arm plate which pivot downwardly to bring the idler rollers into or out of contact with the first rollers. The downward pivoting motion is provided by the restoring force of first and second springs which are disposed on each arm plate so as to cause the arm plates to pivot independently.

6 Claims, 8 Drawing Sheets

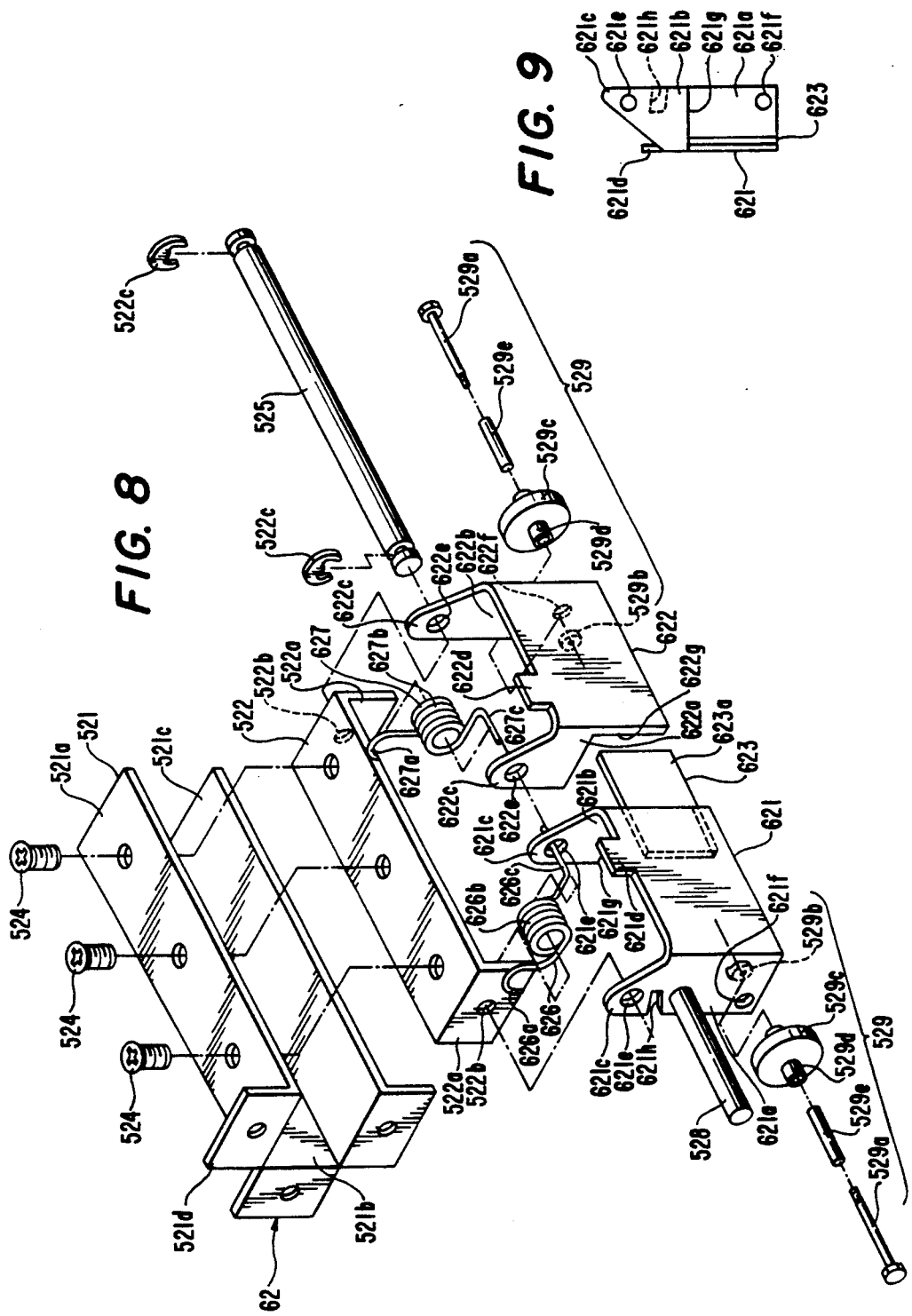

BEVERAGE EXTRACTING APPARATUS FOR VENDING MACHINES

BACKGROUND OF THE INVENTION

1. Field of the Invention

The present invention relates to a beverage extracting apparatus for vending machines which mixes water and the raw material of a beverage, extracts the essence from the raw material as a liquid extract and filtrates the liquid extract via filter paper to create a drinkable beverage, and in particular, to the mechanism for advancing a roll of filter paper after each drink is dispensed.

2. Description of the Prior Art

A conventional beverage extracting apparatus for vending machines dispensing individual portions of a beverage, for example, coffee, into a cup, is illustrated in FIGS. 1-6. With reference to FIGS. 1-3, beverage extracting apparatus 10' includes cup-shaped cylinder 11 made of polysulfone resin and mixing hopper 12. Hopper 12 mixes hot water introduced from a conventional hot water storage tank (not shown) and raw powder, for example, coffee powder, deposited from a conventional raw material bin (not shown) and forms a liquid mixture of the hot water and the powder.

Cylinder 11 includes inflow port 111 formed through the upper closed end thereof, and opening 112 at the bottom. Valve 13 is made of rubber and is disposed at the upper closed end of cylinder 11 and functions to open and close port 111. Filter support 15 made of polysulfone resin is disposed below and is spaced from opening 112 of cylinder 11. Filter support 15 includes flat top end surface 151. Filter paper 14 is dispensed from a roll and passes across surface 151 beneath opening 112. Opening 112 is opened and closed by the vertical motion of filter support 15, which brings filter paper 14 into and out of contact with cylinder 11. Opening 112 is covered by filter paper 14 when it is in contact with cylinder 11. As particularly illustrated in FIG. 3, a pair of guide edges 151a are formed at the flat top end surface 151 of filter support 15 and function to guide filter paper 14 across flat top end surface 151 of filter support 15 in the direction of arrow A. Filter support 15 is firmly disposed on filter support drive mechanism 20, and is reciprocatingly moved upwardly and downwardly by virtue of operation of filter support drive mechanism 20. Filter support drive mechanism 20 is described in detail in U.S. Pat. No. 4,998,462 to Sekiguchi, hereby incorporated by reference, and a detailed explanation thereof is omitted.

Assembling panel 40 is made of steel, and is prepared by press working to have a U-shaped lateral cross section so that a hollow space 400 is defined at the rear of panel 40. Inner plate 42 is fixedly disposed within hollow space 400 of panel 40. Panel 40 includes a pair of vertical straight collars 41 formed along both side ends thereof, respectively. Panel 40 is firmly secured at the front to an inner wall of a box (not shown) of the vending machine by means of a plurality of fasteners (not shown) disposed through a plurality of corresponding holes 41a formed in collars 41 of panel 40. (The terms front and rear are defined with respect to the vending machine to which panel 40 is attached.) The roll of filter paper 14 is disposed about bobbin 141 which is rotatably mounted about shaft 142 at a location below filter support 15. Shaft 142 is firmly secured between assembling panel 40 and arm member 143. Filter paper 14 is conducted from bobbin 141 upwardly to the flat top end surface 151 of filter support via guide member 144 and a plurality of guide rollers 145.

Annular cylindrical valve shaft 30 which may be made of stainless steel is disposed through an opening at the top end of cylinder 11, and is slidable in the vertical direction. The lower end of valve shaft 30 is disposed within the interior hollow space of cylinder 11 near opening 112, and the upper end is disposed at a position above the top end of cylinder 11. At the upper end, shaft 30 is vertically movably fixed within an extension of assembling panel 40. Tube 31 which may be made of silicon rubber connects the upper end of valve shaft 30 to outlet port 32a of air pump 32 and allows pressurized air from air pump 32 to be conducted to valve shaft 30. Air pump 32 is fixedly disposed within hollow space 400 of panel 40.

Valve 13 is disposed within the interior hollow space of cylinder 11, and is firmly mounted about shaft 30 adjacent to the inner concave surface of the top end of cylinder 11. Valve shaft 30 is linked to a conventional driving mechanism (not shown) known in the art and may be reciprocatingly moved upwardly and downwardly by virtue of the operation of the driving mechanism. The driving mechanism is disposed within hollow space 400 of panel 40. Upward and downward movement of shaft 30 causes corresponding movement of valve 13.

Filter paper drawing out or dispensing mechanism 50 includes driving roller assembly 51 and a corresponding idler roller assembly 52 disposed on assembling panel 40 at a position adjacent to filter support 15 and cylinder 11. Driving roller assembly 51 includes motor 512 which is fixedly secured to inner plate 42 and includes drive shaft 512a. Assembly 51 further includes a pair of driving rollers 511 which are fixedly mounted about drive shaft 512a of motor 512 by means of a plurality of fasteners 513 and which may be made of polyacetals. Each of driving rollers 511 includes an annular flanges portion 511a formed at the axially outer end thereof.

Drive shaft 512a of motor 512 is rotatably supported by inner plate 42, panel 40 and outer plate 43 which extends from outer frame 21 of filter support drive mechanism 20. Driving rollers 511 are spaced from each other and are disposed between panel 40 and outer plate 43. Driving rollers 511 are disposed such that their axes are substantially perpendicular to guide edges 151a of filter support 15. Cam rotor 514 is fixedly mounted about drive shaft 512a of motor 512, rearwardly of the forward wall of panel 40.

With reference to FIG. 2a, cam rotor 514 has the configuration of an annular disc, and includes asymmetrical first circular flange 514a forming the outer periphery of rotor 514, second circular flange 514b forming the inner periphery, and a plurality of struts radially bridging the first and second circular flanges. Drive shaft 512a is disposed through second flange 514b. Protrusion 514d is formed at one location in first circular flange 514a and thus the outer periphery of cam 514. Protrusion 514d creates small depressions 514d' and 514d'' on either side thereof.

With reference to FIG. 4, idler roller assembly 52 of filter paper drawing out mechanism 50 includes bar member 521 having a lateral cross section which is generally U-shaped and a rectangular auxiliary plate 522 having downwardly bent side end portions 522a. Bar member 521 includes upper wall 521a, side wall 521b and lower wall 521c, and extending flanges 521d.

Bar member 521 is fixedly secured to a front wall of panel 40 in a cantilevered manner by means of a plurality of fasteners 530 disposed through holes formed in extending flanges 521d. Auxiliary plate 522 is disposed within bar member 521 and is fixedly secured to upper wall 521a of bar member 521 by means of a plurality of fasteners 524.

First cylindrical rod 525 penetrates side end portions 522a of auxiliary plate 522 through a pair of circular holes 522b which are formed in side end portions 522a of auxiliary plate 522. Both ends of first cylindrical rod 525 project exteriorly of side end portions 522a of auxiliary plate 522, and are firmly secured thereto by means of a pair of snap rings 522c, respectively. Spring member 526 having arcuate-shaped end portions 526a, a pair of coiled portions 526b continuing from the respective arcuate-shaped end portions 526a and straight portion 526c extending between the pair of coiled portions 526b is loosely mounted about first cylindrical rod 525.

Idler roller assembly 52 further includes stainless steel rectangular arm plate 527 having inner and outer side end portions 527a and 527b bent at right angles to the forward or main surface of plate 527, so as to extend rearwardly with respect to the main surface towards bar member 521. A pair of first upward projections 527c having an inclined front end project upwardly from the upper edge of inner and outer side end portions 527a and 527b of arm plate 527, respectively. Second upward projection 527d projects upwardly from the upper edge of the forward surface of arm plate 527 at a central location. A pair of first circular holes 527e are formed in the pair of first upward projections 527c of arm plate 527, respectively. A pair of second circular holes 527f are formed in a lower region of inner and outer side end portions 527a and 527b of arm plate 527, respectively. Cut-out portion 527g is formed in inner side end portion 527a of arm plate 527.

Second cylindrical rod 528 is fixedly attached at one end to the exterior surface of inner side end portion 527a of arm plate 527, and loosely passes through slot 401 formed in panel 40 so as to be freely moveable within the slot. The other end of second cylindrical rod 528 extends to the location of an outer peripheral surface of cam rotor 514 and is in contact with or spaced from the outer peripheral surface of cam rotor 514 depending upon the orientation of cam rotor 514. Rotor 514 may engage rod 528 and cause it to move to an upper position. Alternatively, rotation of cam rotor 514 may cause cam rotor 514 to move out of contact with rod 528, which allows rod 528 to be in a lower position. As shown in FIG. 2a and explained further below with respect to FIGS. 2a-2d, rotation of cam rotor 514 in the direction of arrow B causes rod 528 to assume several possible positions 528A-528D, relative to cam rotor 514. In position 528D, rod 528 is spaced from and out of contact with rotor 514.

Arm plate 527 is rotatably mounted about first cylindrical rod 525 which is disposed through first circular holes 527e and through coiled portions 526b of spring member 526. Spring member 526 is disposed laterally within side end portions 522a of auxiliary plate 522. Arcuate-shaped end portions 526a of spring member 526 extend upwardly into resilient contact with a lower end surface of auxiliary plate 522, and straight portion 526c of spring member 526 is disposed about second upward projection 527d of arm plate 527. The restoring force of arcuate-shaped end portions 526a and coiled portions 526b continuously acts downwardly on arm plate 527 through projection 527d so that plate 527 would tend to assume the downward position as shown in FIG. 6. However, second cylindrical rod 528 of arm plate 527 is normally maintained in the upper position by flange 514a of cam rotor 514. As a result, arm plate 527 is normally maintained in the upper position as shown in FIG. 5 against the restoring force of spring member 526.

A pair of idler roller sub-assemblies 529 are secured on inner and outer side end portions 527a and 527b of arm plate 527 by two pairs of bolts and nuts 529a and 529b which are disposed through the pair of second circular holes 527f, respectively. Bolts and nuts 529a and 529b may be made of stainless steel. Each of idler roller sub-assemblies 529 includes an annular disk-shaped idler roller 529c which may be made of polyurethane rubber, first collar 529d which may be made of stainless steel and second collar 529e which may be made of polyacetals. The length of first collar 529d is designed to be slightly less than the length of second collar 529e.

Each idler roller 529c is disposed on arm plate 527 as follows. Idler roller 529c is fixedly mounted about first collar 529d which is rotatably mounted about second collar 529e. Bolt 529a passes through second collar 529e. Bolt 529a and second collar 529e are disposed through second circular hole 527f with idler roller disposed laterally interior of side end portion 527a. Nut 529b is disposed on bolt 529a to fixedly secure second collar 529e to side end portion 527a of arm plate 527, with one end of first collar 529d disposed adjacent the inner surface of side end portion 527a. Thus, first collar 529d and idler roller 529c are freely rotatably supported on the lower region of side end portion 527a, with axial movement precluded. Similarly, the other idler roller 529c is rotatably supported by the lower region of side end portion 527b of arm plate 527 together with first collar 529d with axial movement precluded.

The operation of the above-described beverage extracting apparatus 10' of a vending machine is described below. When a beverage is to be dispensed from the vending machine, filter support driving mechanism 20 operates in a known manner to move filter support 15 upwardly in order to close opening 112 of cylinder 11 with filter paper 14. Simultaneously, the position of valve 13 is maintained in the lower position opening inflow port 111 of cylinder 11, and the location of second cylindrical rod 528 is maintained in its highest position indicated as 528B due to the contact between flange 514a of cam rotor 514 and rod 528, thereby forcing arm plate 527 to be in the upper position against the restoring force of spring 526. Thus, the location of arm plate 527 is maintained in the first position in which idler rollers 529c of idler roller assembly 52 are spaced from the driving rollers 511 of the corresponding driving roller assembly 51 as illustrated in FIG. 5.

When opening 112 of cylinder 11 is completely closed by filter paper 14, a predetermined volume of hot water is introduced into mixing hopper 12 from a conventional hot water storage tank (not shown) and a predetermined volume of coffee powder is deposited from a conventional raw material bin (not shown), forming a liquid mixture of hot water and coffee powder. The liquid mixture is then introduced into cylinder 11 through opened inflow port 111 of cylinder 11 and is stored in cylinder 11. In cylinder 11, the coffee essence is extracted from the coffee powder and takes the form of a liquid extract.

Sequentially, valve shaft 30 is moved upwardly together with valve 13 by virtue of operation of the aforementioned driving mechanism in order to close inflow port 111 of cylinder 11. Simultaneously, opening 112 of cylinder 11 remains closed by filter paper 14, and the upper position of arm plate 527 as shown in FIG. 5 is maintained due to the continued contact between flange 514a of cam rotor 514 and rod 528. Then, pressurized air is supplied into cylinder 11 from air pump 32 via tube 31 and annular cylindrical valve shaft 30, causing bubbling of the liquid extract in cylinder 11. The liquid extract in cylinder 11 is forcibly filtrated via filter paper 14 by virtue of the pressure of the pressurized air supplied into cylinder 11 and drips to a mixing bin (not shown). Thereafter, if requested, sugar and cream are added to the liquid extract in the mixing bin from a sugar bin (not shown) and a cream bin (not shown), respectively, and a completed liquid with sugar and/or cream or without sugar and cream is poured into a cup as a beverage to be sold.

Although the liquid extract is made from hot water and a raw material (for example, coffee powder) in the above prior art embodiment, the liquid extract may be made from water at any temperature (for example, cold water) and raw material having any formation.

When the forcible filtration of the liquid extract is completed, filter support driving mechanism 20 again operates to downwardly move filter support 15 in a manner known in the art in order to open opening 112 of cylinder 11. Filter paper 14 is thus spaced from cylinder 11. Valve shaft 30 is downwardly moved together with valve 13 by virtue of operation of the aforementioned driving mechanism in order to open inflow port 111 of cylinder 11. Then, motor 512 operates to rotate drive shaft 512a thereof together with both cam rotor 514 and driving rollers 511. Cam rotor 514 rotates in the direction of arrow B as shown in FIG. 2a.

As discussed above, initially, that is, during the dispensing operation, cam rotor 514 is in the position shown in FIG. 2d in which rod 528 is in position 528B, where it is disposed upon depression 514d'. In this situation, rod 528 is forced into its highest position, and thus arm plate 527 assumes its highest position as shown in FIG. 5 in which idler rollers 529c are out of contact with driving rollers 511. After dispensing is completed, cam rotor 514 rotates, rod 528 moves along the surface of first flange 514a from the first position indicated at 528B until it reaches the position indicated by position 528C. During this time, due to the asymmetric nature of the surface of cam rotor 514, the surface of cam rotor 514 which is in contact with rod 528 effectively is lowered gradually. Thus, rod 528 and arm plate 527 attached thereto are able to assume a lower vertical position, and are, in fact, lowered gradually due to the restoring force of spring 526 acting on arm plate 527. When rod 528 reaches position 528C shown in FIG. 2b, rod 528 is in the lowest position, and arm plate 527 reaches its lowest position. As shown in FIG. 6, idler rollers 529c are in contact with driving rollers 511, and advancement of filter paper 514 begins due to rotation of driving rollers 511 by shaft 512a.

As rotation of drive shaft 512a continues, rod 528 moves from position 528C through position 528D. When rod 528 is in position 528D, it is not in contact with cam rotor 514. During this time, in which the outer surface of rotor 514 having the largest radius of curvature is disposed adjacent rod 528, rod 528 remains in position 528D out of contact with cam rotor 514. Thus, arm plate 527 and rod 528 remain in the lowest position in which idler rollers 529c are in contact with drive rollers 511, and advancement of filter paper 514 continues. Eventually, rod 528 reaches the position shown at 528A, in which it is adjacent depression 514d'''. As cam rotor 514 continues to rotate, rod 528 once again is contacted by the outer surface of cam rotor 514, in particular, at protrusion 514d, and rod 528 is quickly lifted upwardly due to contact therewith. Arm plate 527 is forced upwardly against the restoring force of spring 526, and idler rollers 529c are moved out of contact with drive rollers 511. Advancement of filter paper 14 is terminated. Rotation of cam rotor 514 continues, until rod 528 reaches position 528B, where it is received in depression 514d'. Rotation of cam rotor 514 is stopped, and rod 528 remains stably seated in depression 514d', and arm plate 527 assumes the upper position shown in FIG. 5, in which arm plate 527 is in the upper position shown in FIG. 5.

When idler rollers 529c are in pressed contact with driving rollers 511 through filter paper 14, an inner end region of bottom portion 521c of bar member 521 is received within cut-out portion 527g formed in inner side end portion 527a of arm plate 527 so as to avoid interference between bar member 521 and arm plate 527.

As discussed, rotation of driving rollers 511 causes filter paper 514 to advance due to the contact of driving rollers 511 with idler rollers 529c. Consequently, filter paper 14 is advanced and unwound from bobbin 141 in the direction of arrow A shown in FIGS. 1 and 3 by virtue of the cooperative rotational motions of driving rollers 511 and corresponding idler rollers 529c, and is moved for a predetermined appropriate interval onto flat top end surface 151 of filter support 15 via guide member 144 and guide rollers 145. Grounds 100 of the coffee powder which, after the beverage is dispensed, remain on flat top end surface 151 of filter support 15 through one portion of filter paper 14, are removed, and a new fresh portion of filter paper 14 is disposed on flat top end surface 151 of filter support 15 for the next filtration. Grounds 100 of coffee powder are conducted together with filter paper 14 into a scrap container (not shown) disposed within the box of the vending machine. After removal of the grounds, the location of arm plate 527 is maintained in the upper position illustrated in FIG. 5 until the mechanism is activated again to remove the grounds 100 of coffee powder from flat top end surface 151 of filter support 15.

In general, driving rollers 511 and the corresponding idler rollers 529c are secured such that when arm plate 527 is located at the second position as illustrated in FIG. 6, the axes of driving rollers 511 are parallel to the axes of the corresponding idler rollers 529c. Positioning the rollers in this manner helps ensure that filter paper 14 is moved for the predetermined appropriate interval onto flat top end surface 151 of filter support 15 in the direction of arrow A as shown in FIG. 3 by virtue of the cooperative rotational motions of driving rollers 511 and corresponding idler rollers 529c.

However, in the above-described prior art embodiment, when arm plate 527 is located at the second position as illustrated in FIG. 6, it is difficult to position driving rollers 511 and the corresponding idler rollers 529c so that their axes are parallel because arm plate 527 is twisted by the torsional stress generated by the restoring force of spring member 526. Arm plate 527 is subjected to torsional stress sufficient to cause the undesired twisting thereof since arm plate 527 is supported by bar member 521 through auxiliary plate 522 and first cylindrical rod 525 in a substantially cantilevered manner. Therefore, the effectiveness of the cooperative rotational motions of driving rollers 511 and corresponding idler rollers 529c is decreased. As a result, filter paper 14 may not be moved for the appropriate interval onto flat top end surface 151 of filter support 15.

SUMMARY OF THE INVENTION

The present invention is directed to a beverage extracting apparatus for vending machines. The apparatus includes a cylinder having an inflow port and an open bottom. Water and a raw material of a beverage are introduced into the cylinder through the inflow port and mixed in the cylinder. A continuous filter member is disposed below the bottom of the cylinder. A filter support supports the filter member and vertically moves the filter member into and out of contact with the cylinder to open and close the bottom of the cylinder.

The apparatus further includes an advancing mechanism which advances the filter member. The advancing mechanism includes: a pair of first roller elements; a driving mechanism which rotates the first rolling elements; a pair of second roller elements; and a supporting member for rotatably supporting the pair of second roller elements above the pair of first roller elements, with each roller element of the second pair disposed above a corresponding roller element of the first pair. The driving mechanism causes the supporting member to pivot, thereby pivoting the pair of second roller elements into or out of contact with the pair of first roller elements.

The supporting member includes a first supporting element rotatably supporting one of the pair of second roller elements, a second supporting element separated from the first supporting element and rotatably supporting the other of the pair of second roller elements, and a bridging element fixed to one of the first and second supporting elements and movable into or out of contact with the other of the first and second elements. The first and second supporting elements are independently acted upon so as to be pivoted to a position in which the second pair of roller elements is in contact with the first pair of roller elements.

In the present invention, the single arm plate of the prior art is replaced by two separate arm plates which are independently acted upon to be pivoted to the lower position, thereby reducing the overall torsional stress on the arm plates. Thus, the arm plates are not twisted, allowing the axes of the driving rollers and the idler rollers to remain parallel. Accordingly, the filter paper is more precisely advanced for the predetermined appropriate interval onto the filter support device of the beverage extracting apparatus.

BRIEF DESCRIPTION OF THE DRAWINGS

FIG. 8 is an enlarged exploded perspective view of an idler roller assembly of the beverage extracting apparatus shown in FIG. 7.

FIG. 9 is a side view of a first rectangular arm plate of an idler roller assembly shown in FIG. 8.

DETAILED DESCRIPTION OF THE PREFERRED EMBODIMENT

Figure 1:
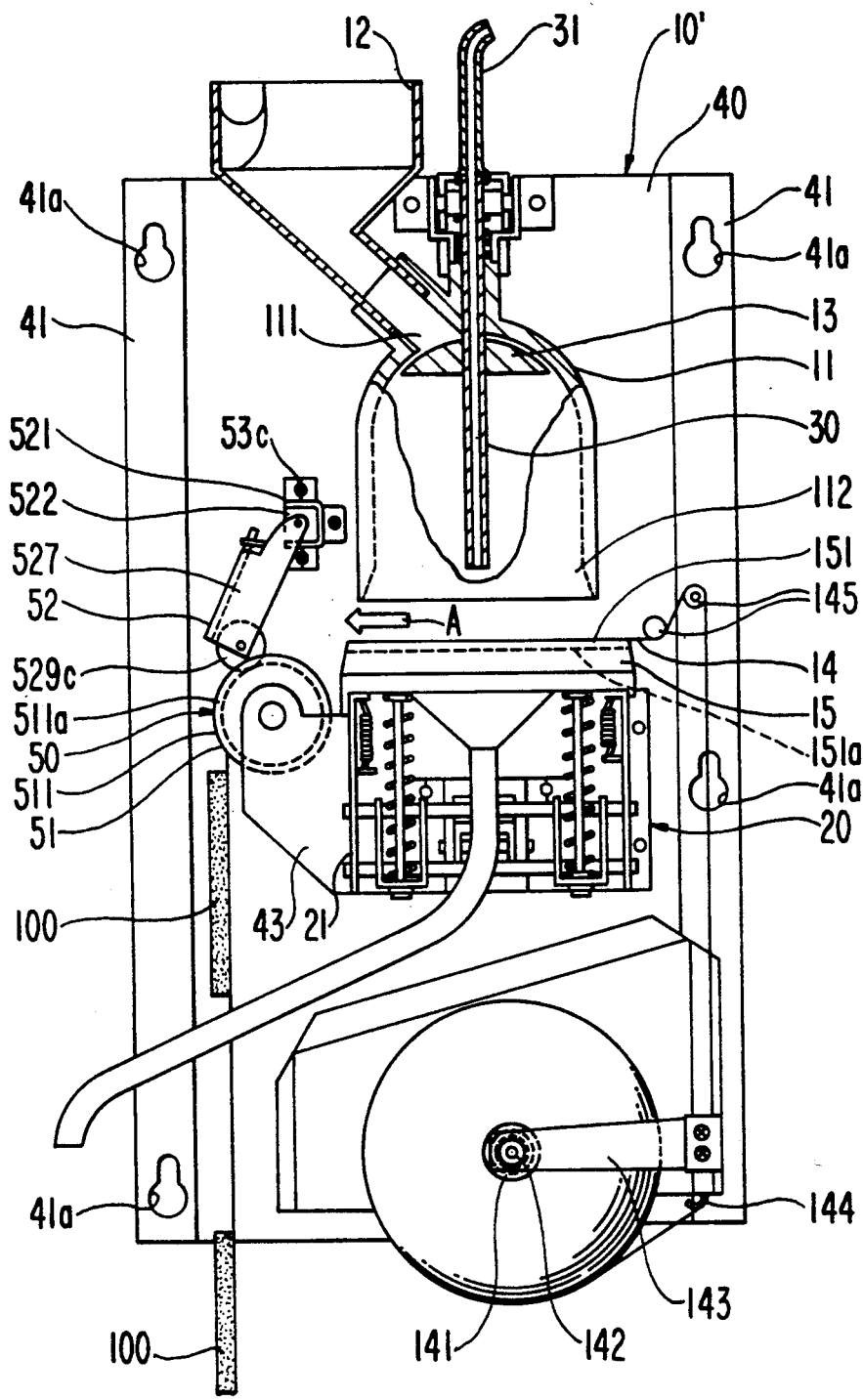
FIG. 1 is an elevation view of a beverage extracting apparatus used for vending machines in accordance with one prior art embodiment.
Figure 2:
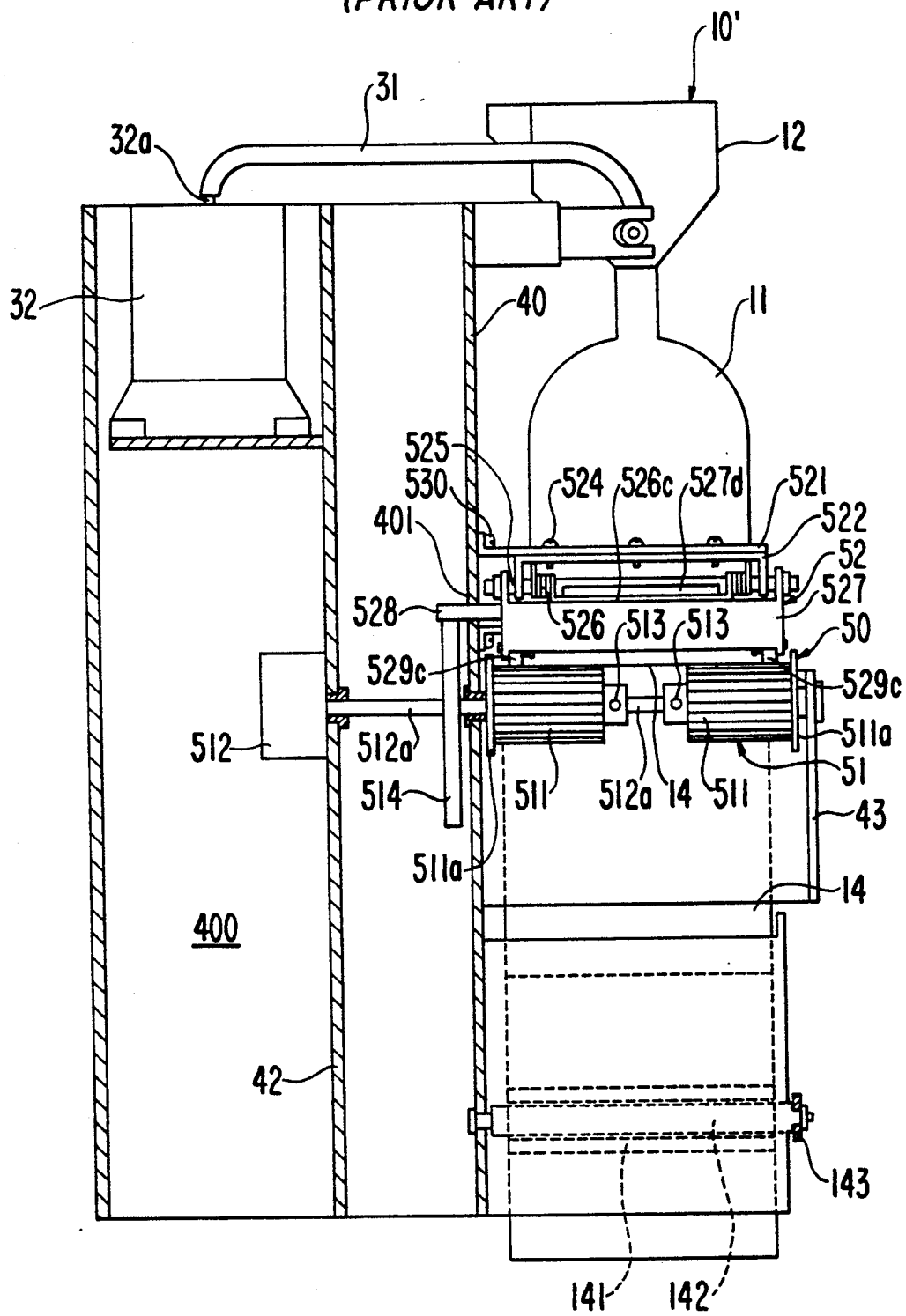
FIG. 2 is a side view of the beverage extracting apparatus shown in FIG. 1.
Figure 2A:
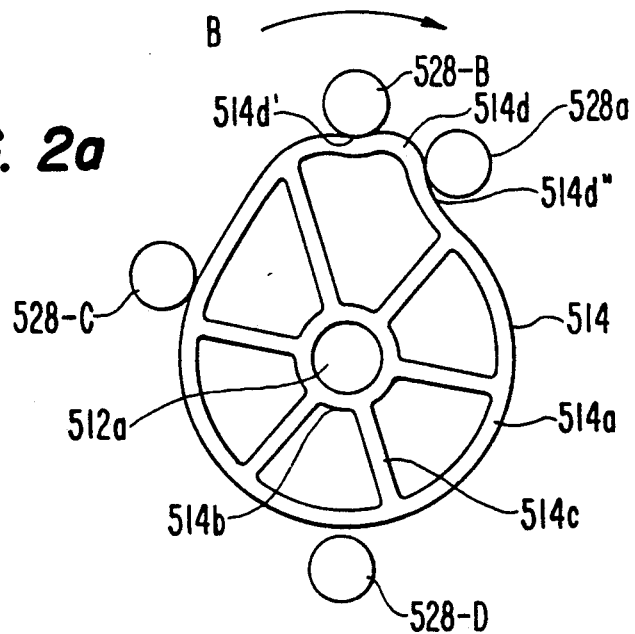
FIGS. 2a-2d show the contact between the cam rotor and a rod shown in FIG. 2, and illustrate the various positions of the rod relative to the cam rotor.
Figure 2B:
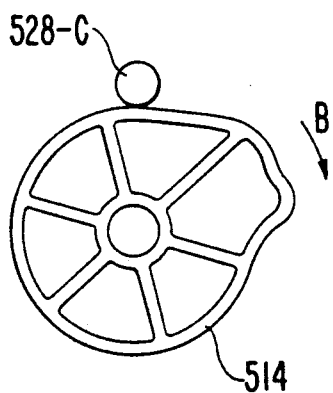
Figure 2C:
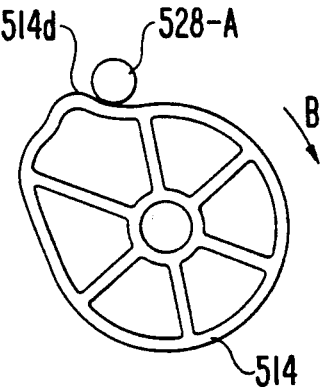
Figure 2D:
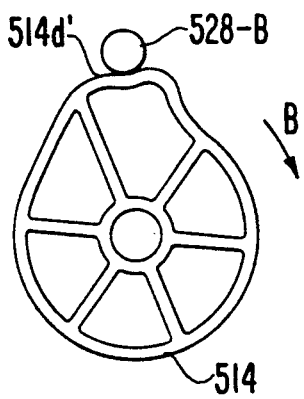

A beverage extracting apparatus for use in vending machines in accordance with the present invention is illustrated in FIGS. 7-11. In the drawings, the same numerals are used to denote the corresponding elements shown in FIGS. 1-6. With the exception of the mechanism for drawing out the filter paper, the structure and functioning of the beverage extracting apparatus according to the present invention is the same as the structure and operation of the prior art. Accordingly, only the structure and operation of the filter paper drawing out mechanism will be described in detail below.

Figure 7:
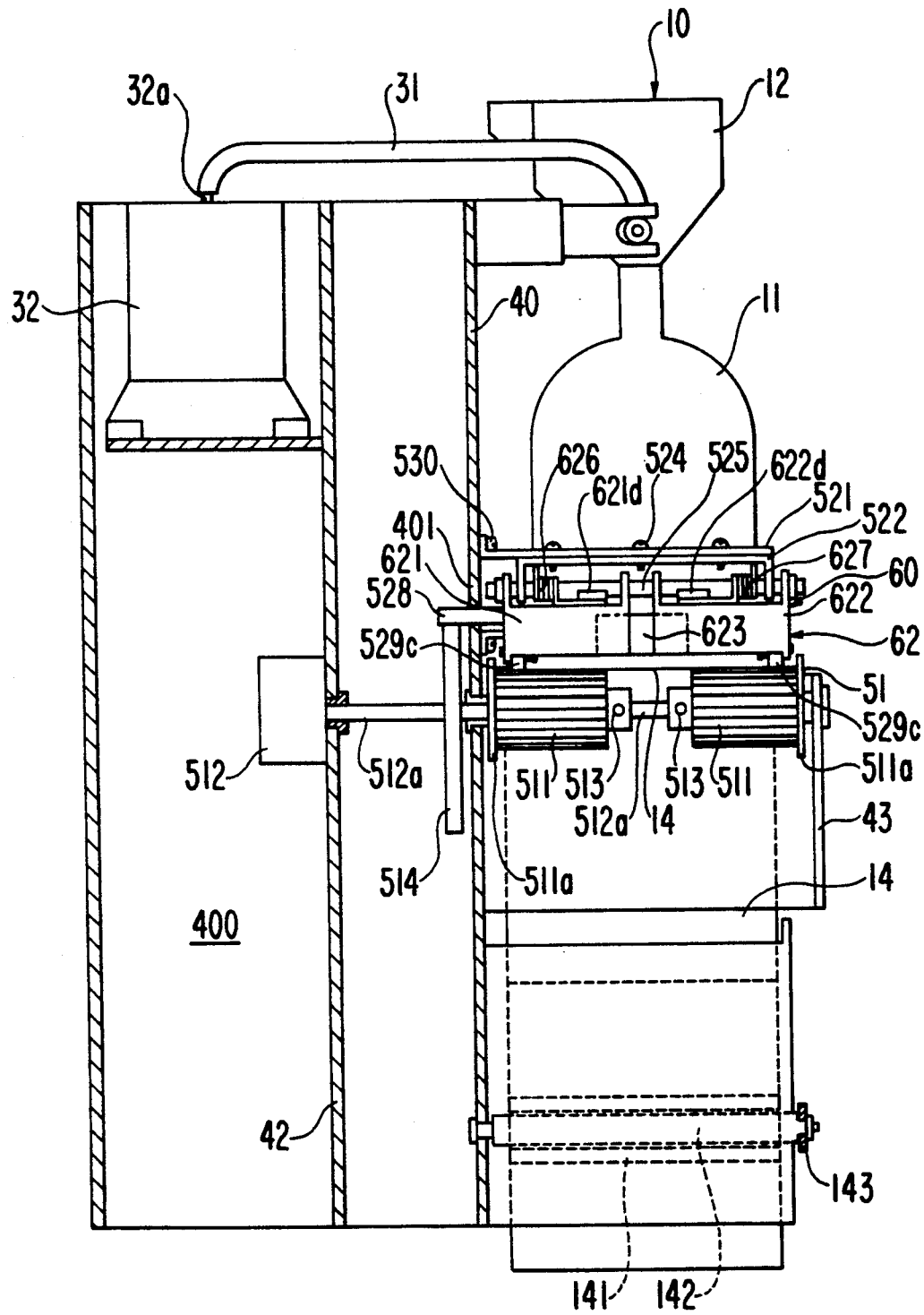
FIG. 7 is a side view of a beverage extracting apparatus used for vending machines in accordance with the present invention.

With reference to FIGS. 7 and 8, filter paper drawing mechanism 60 of beverage extracting apparatus 10 includes idler roller assembly 62 having first rectangular arm plate 621 and second rectangular arm plate 622 which is spaced from first rectangular arm plate 621 and is disposed outwardly of first rectangular arm plate 621, that is, further away from assembling panel 40. Arm plates 621 and 622 may be made of stainless steel. First arm plate 621 includes inner and outer side end portions 621a and 621b bent at right angles to the forward main surface of plate 621, so as to extend rearwardly with respect to the forward main surface, towards bar member 521. A pair of first upward projections 621c having an inclined front end project upwardly from the upper edge of inner and outer side end portions 621a and 621b of first arm plate 621, respectively. Second upward projection 621d projects upwardly from the upper edge of the forward surface of first arm plate 621 at a central location. A pair of first circular holes 621e are formed in the pair of first upward projections 621c of first arm plate 621, respectively. Second circular hole 621f is formed in a lower region of inner side end portion 621a of first arm plate 621. Second cylindrical rod 528 is fixedly attached at one end to an exterior surface of inner side end portion 621a of first arm plate 621, and loosely passes through slot 401 formed in panel 40. The other end of second cylindrical rod 528 is in contact with or spaced from the outer peripheral surface of cam rotor 514, as described above.

Second arm plate 622 includes inner and outer side end portions 622a and 622b bent at right angles to the forward main surface of plate 622, so as to extend rearwardly with respect to the forward main surface, towards bar member 521. A pair of first upward projections 622c having an inclined front end project upwardly from a top end surface of the inner and outer side end portions 622a and 622b of second arm plate 622, respectively. A second upward projection 622d projects upwardly from the upper edge of the forward surface of second arm plate 622 at a central location. A pair of first circular holes 622e are formed in the pair of first upward projections 622c of second arm plate 622, respectively. Second circular hole 622f is formed in a lower region of the outer side end portion 622b of second arm plate 622.

With reference to FIG. 9 additionally, rectangular cut-out portion 621g is formed at the outer side end portion 621b of first arm plate 621, and rectangular cut-out portion 622g is formed at the inner side end portion 622a of second arm plate 622. Auxiliary rectangular arm plate 623 which may be made of stainless steel is disposed to bridge the gap between first and second arm plates 621 and 622 through rectangular cut-out portion 621g of first arm plate 621 and rectangular cut-out portion 622g of second arm plate 622. An inner end portion of auxiliary arm plate 623 is permanently fixed to the rear side of the main surface of first arm plate 621 by spot welding. Arm plate 623 is not permanently secured to second arm plate 622, but is disposed to be removably in contact therewith.

Arm plates 621 and 622 are rotatably mounted about first cylindrical rod 525 which pass through the pair of first circular holes 621e of first arm plate 621 and the pair of first circular holes 622e of second arm plate 622, respectively. A pair of first and second spring members 626 and 627 are loosely mounted about first cylindrical rod 525. First spring member 626 is located between the pair of first upward projections 621c of first arm plate 621, within auxiliary plate 522. Similarly, second spring member 627 is located between the pair of first upward projections 622c of second arm plate 622, within auxiliary plate 522. Each of first and second spring members 626 and 627 includes arcuate-shaped end portion 626a (627a), coiled portion 626b (627b) continuing from arcuate-shaped end portion 626a (627a) and straightened end portion 626c (627c) continuing from the coiled portion 626b (627b).

Arcuate-shaped portion 626a of first spring member 626 extends upwardly into resilient contact with the lower end surface of auxiliary plate 522, and straight portion 626c of spring member 626 is disposed about second upward projection 621d of first arm plate 621. Arcuate-shaped portion 627a of second spring member 627 extends upwardly into resilient contact with the lower end surface of auxiliary plate 522, and straight portion 627c of second spring member 627 is disposed about second upward projection 622d of second arm plate 622. The restoring force of arcuate-shaped portions 626a and 627a and coiled portions 626b and 627b continuously acts downwardly on first and second arm plates 621 and 622, respectively, so that they would tend to assume the downward position shown in FIG. 11, that is, they continuously tend to pivot downwardly on first cylindrical rod 525. Furthermore, since arcuate-shaped portion 626a of first spring member 626 is resiliently in contact with the lower end surface of the auxiliary plate 522, and straight portion 626c of first spring member 626 is resiliently in contact with the front surface of second upward projection 621d of first arm plate 621, axial sliding movement of first arm plate 621 along first cylindrical rod 525 is prevented. Similarly, axial sliding movement of second arm plate 622 is prevented as well.

The pair of idler roller sub-assemblies 529 are disposed within the first and second arm plates 621 and 622, respectively, in the same manner as discussed above with respect to arm plate 527. By fixedly securing second collar 529e to the inner surface of the lower region of inner side end portion 621a of arm plate 621 by bolt and nut 529a and 529b disposed through second circular hole 621f, one idler roller 529c is rotatably supported by the lower region of the inner side end portion 621a of arm plate 621 together with first collar 529d in a manner which precludes axial movement thereof. Similarly, the other idler roller 529c is rotatably supported by the lower region of the outer side end portion 622b of arm plate 622 together with first collar 529d in a manner which precludes axial movement thereof.

The operation of motor 512 and cam rotor 512 with respect to second cylindrical rod 528 is the same as described above with reference to FIGS. 2a–d, to either allow rod 528 and thus first arm plate 621 to be in the lower position due to the restoring force of spring 626 or forced into the upper position due to contact between rod 528 and cam rotor 514. In particular, with further reference to FIGS. 10 and 11, when motor 512 operates to rotate drive shaft 512a thereof, together with cam rotor 514 and driving rollers 511, so as to gradually move rod 528 along rotor 514, rod 528 gradually is allowed to assume the lower position, that is, position 528C relative to cam rotor 514. The restoring force of spring 626 acts upon first arm plate 621, forcing it and rod 528 into the lower position shown in FIG. 11. Simultaneously, auxiliary arm plate 623 is moved out of contact with second arm plate 622, and thus second arm plate 622 is free to move to the lower position due to the restoring force of spring 627.

Figure 11:
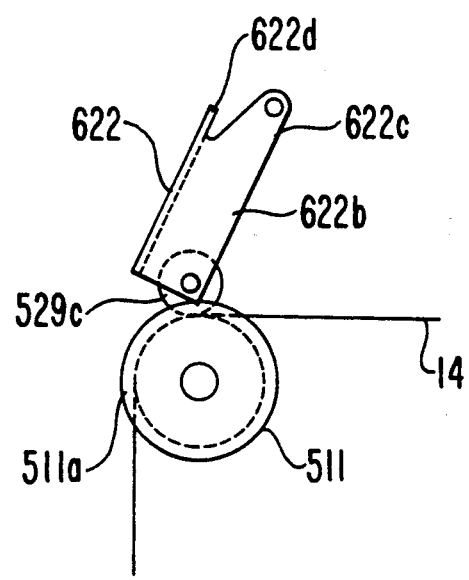
FIG. 11 is a view similar to FIG. 10 in which the idler rollers of the idler roller assembly are pressed into contact with the driving rollers of the corresponding driving roller assembly.

First and second arm plates 621 and 622 pivot downwardly on first cylindrical rod 525 independently of each other due to the fact that the restoring forces of first and second spring members 626 and 627 act separately on arm plates 621 and 622, respectively. When second cylindrical rod 528 is in its lowest position where it is spaced from and out of contact with the outer peripheral surface of cam rotor 514, that is, position 528D, first arm plate 621 is located at the lowest position in which idler rollers 529c of idler roller assembly 62 are pressed into contact with driving rollers 511 of the corresponding driving roller assembly 51 through the filter paper 14 as illustrated in FIG. 11. Second arm plate 622 is also located at the lowest position in which idler rollers 529c attached thereto are pressed into contact with driving rollers 511 through filter paper 14. Accordingly, both idler rollers 529c are in contact with the corresponding drive roller 511 so as to cause filter paper 514 to be advanced due to rotation of drive rollers 511 by shaft 512.

When idler rollers 529c are pressed into contact with driving rollers 511 through filter paper 14, an inner end region of bottom portion 521c of bar member 521 is received within cut-out portion 621h formed in the inner side end portion 621a of first arm plate 621 so as to avoid interference between bar member 521 and first arm plate 621.

Figure 10:
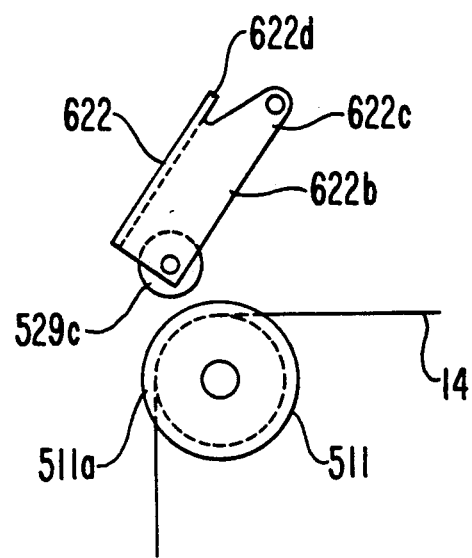
FIG. 10 is a schematic side view of a filter paper drawing out mechanism of the beverage extracting apparatus shown in FIG. 7, in which the idler rollers of the idler roller assembly are spaced from the driving rollers of a corresponding driving roller assembly.

Thereafter, when rod 528 contacts protrusion 514d, rod 528 and first arm plate 621 are forced upwardly, against the restoring force of spring 626, until rod 528 is received in depression 514d', and first arm plate 621 assumes the position shown in FIG. 10. As first arm plate 621 is pivoted on first cylindrical rod 525 against the restoring force of first spring member 626, auxiliary arm plate 623 fixed thereto is pivoted and the front surface of outer side end portion 623a which is in contact with the rear end surface of second arm plate 622, simultaneously causes second arm plate 622 to pivot along rod 525 and be lifted to the position shown in FIG. 10. Accordingly, both idler rollers 629c simultaneously are brought out of contact with drive rollers 511, and advancement of filter paper 514 is terminated. When second cylindrical rod 528 reaches its highest position, operation of motor 512 is terminated so as to stop the rotation of the drive shaft 512a of motor 512, so that the location of the first and second arm plates 621 and 622 are maintained at the first position in which idler rollers 529c of idler roller assembly 62 are spaced from driving rollers 511 of the corresponding driving roller assembly 51 as illustrated in FIG. 10.

Figure 3:
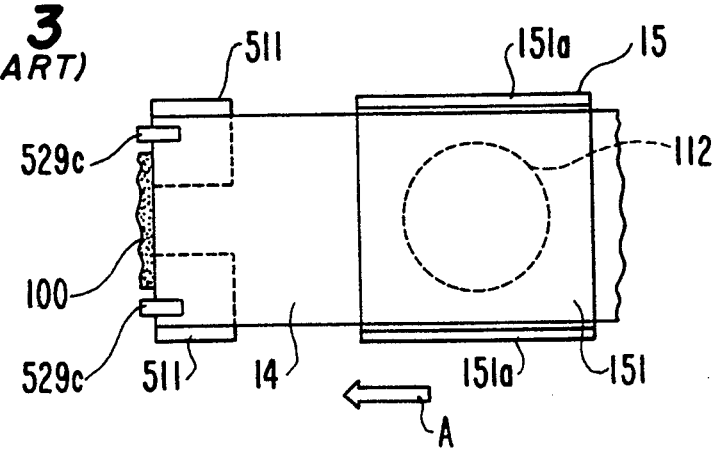
FIG. 3 is a schematic plan view of the beverage extracting apparatus shown in FIG. 1.
Figure 4:
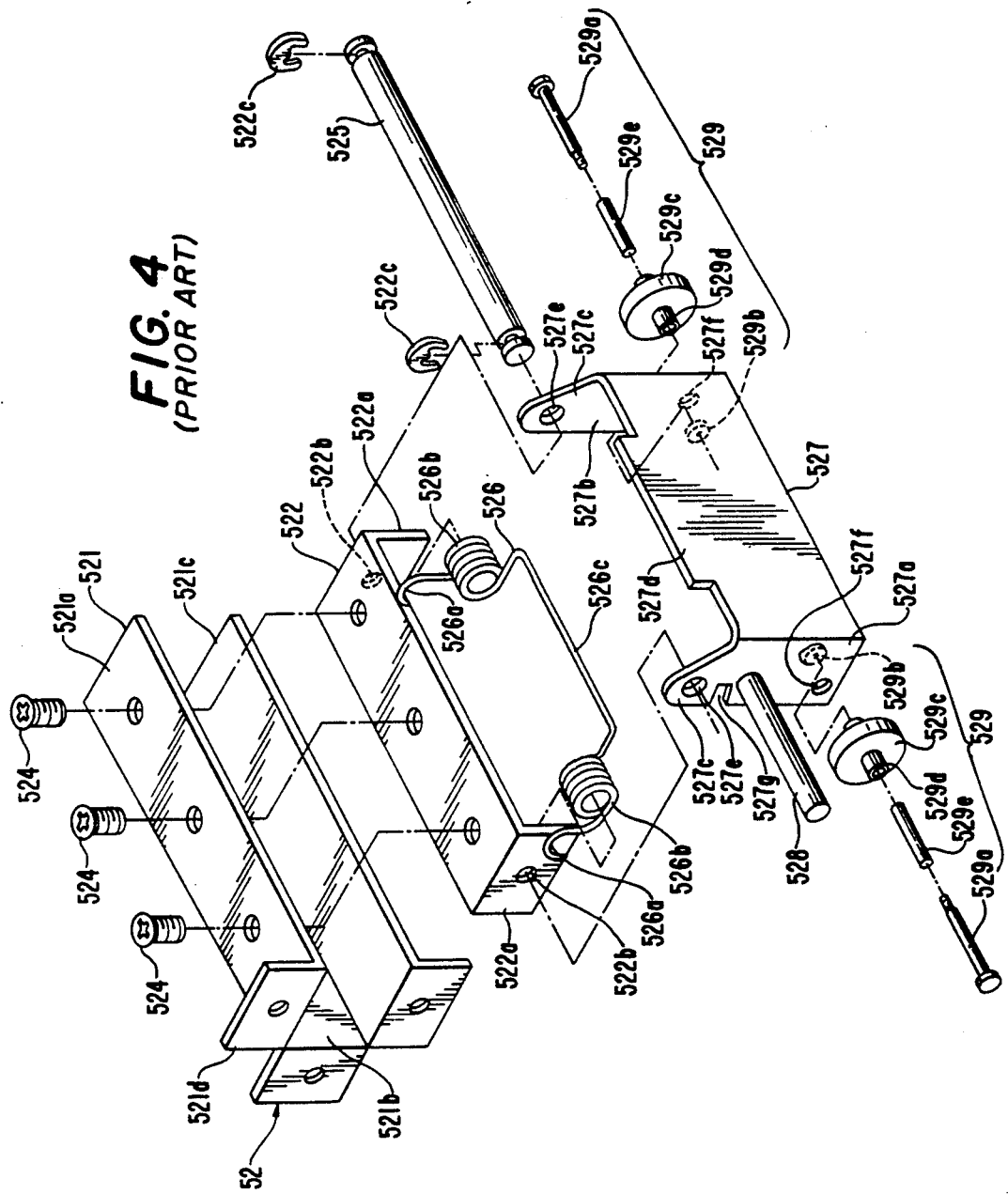
FIG. 4 is an enlarged exploded perspective view of an idler roller assembly of the beverage extracting apparatus shown in FIG. 1.
Figure 5:
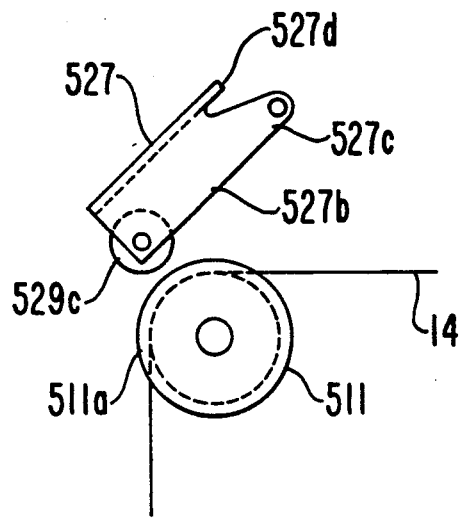
FIG. 5 is a schematic side view of a filter paper drawing out mechanism of the beverage extracting apparatus shown in FIG. 1, in which the idler rollers of an idler roller assembly are spaced from the driving rollers of a corresponding driving roller assembly.
Figure 6:
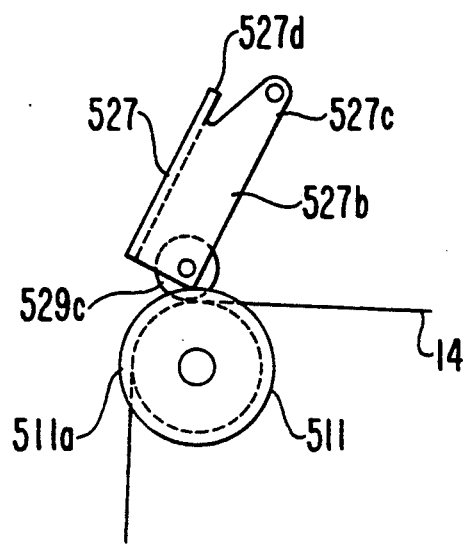
FIG. 6 is a view similar to FIG. 5 in which the idler rollers of the idler roller assembly are pressed into contact with the driving rollers of the corresponding driving roller assembly.

Consequently, filter paper 14 is advanced and unwound from bobbin 141 in the direction A shown in FIG. 3 by virtue of the cooperative rotational motions of driving rollers 511 and the corresponding idler rollers 529c, and is moved for a predetermined appropriate interval onto flat top end surface 151 of filter support 15 via guide member 144 and guide rollers 145. Grounds 100 of coffee powder, which after the beverage is dispensed, remain on flat top end surface 151 of filter support 15 through one portion of filter paper 14 are removed, and a new fresh portion of filter paper 14 is disposed on the flat top end surface 151 of filter support 15 for the next filtration.

According to the present invention, since the arm plate to which the idler rollers are attached is separated into two pieces, i.e., first and second arm plates 621 and 622, the undesirable twisting motion of the arm plate is effectively eliminated. Even though first arm plate 621 is supported by bar member 521 through auxiliary plate 522 and first cylindrical rod 525 in a substantially cantilevered manner, the location at which the restoring force of spring 626 acts on plate 621 which is furthest away from the point at which bar member 521 is fixedly secured to panel 40, is much closer to panel 40 than in the prior art embodiment. Thus, the torsional stress which is generated by the restoring force of spring member 626 and acts on first arm plate 621 is minimal and is effectively absorbed.

Accordingly, when first arm plate 621 is located at the second position where idler rollers 529c of idler roller assembly 52 are pressed into contact with driving rollers 511 of the corresponding driving roller assembly 51 through filter paper 14, driving rollers 511 and corresponding idle rollers 529c can be positioned with the axes of driving rollers 511 parallel to the axes of corresponding idler rollers 529c. Accordingly, filter paper 14 is effectively sent at the appropriate interval onto flat top end surface 151 of filter support 15 in the direction of arrow A shown in FIG. 3 by virtue of the cooperative rotational motions of driving rollers 511 and corresponding idler rollers 529c.

This invention has been described in detail in connection with the preferred embodiment. This embodiment, however, is merely for example only and the invention is not restricted thereto. It will be understood by those skilled in the art that other variations and modifications can easily be made within the scope of this invention as defined by the claims.

I claim:

1. A beverage extracting apparatus for vending machines comprising:
   a cylinder having an inflow port and an open bottom, water and a raw material of a beverage introduced into said cylinder through said inflow port and mixed in said cylinder;
   a continuous filter member disposed below said bottom of said cylinder;
   filter support means for supporting and filter member and for vertically moving said filter member into and out of contact with said cylinder to open and close said bottom of said cylinder;
   advancing means for advancing said filter member onto said filter support means, said advancing means including, a pair of first roller elements, driving means for rotating said first roller elements, a pair of second roller elements, a supporting member for rotatably supporting said pair of second roller elements above said pair of first roller elements with each roller element of said second pair disposed above a corresponding roller element of said first pair, said driving means for causing said supporting member to pivot, said pair of said second roller elements pivoted into or out of contact with said pair of first roller elements by pivoting of said supporting member, the improvement comprising:
   said supporting member comprising a first supporting element rotatably supporting one of the pair of second roller elements, a second supporting element separated from said first supporting element and rotatably supporting the other of said pair of second roller elements, and a bridging element fixed to one of said first and second supporting elements and removably in contact with the other of said first and second elements, and first and second supporting elements independently acted upon so as to be pivoted to a position in which the second pair of roller elements are in contact with the first pair of roller elements.

2. The apparatus recited in claim 1, said advancing means comprising first and second springs disposed in contact with said first and second supporting elements, respectively, said springs each having a restoring force which acts downwardly on said first and second supporting elements, respectively, to cause said second pair of roller elements to contact said first pair of roller elements, said first and second springs acting independently of each other on said first and second supporting elements.

3. The apparatus recited in claim 1, said first and second supporting elements disposed so that the rotational axes of said second pair of roller elements are parallel to the axes of said first pair of roller elements.

4. A filter member advancing mechanism, said mechanism advancing a leading edge of a continuous filter member disposed in a roll for a predetermined distance, said mechanism comprising:
   a pair of first rollers disposed to contact the lower surface of the filter member;

first and second pivotably mounted support members having a pair of second rollers rotatably mounted thereon, each of said pair of second rollers mounted on one of said first and second support members, said support members spaced from each other;

a plate fixed to said first support member and extending across the space between said support members so as to be adjacent said second support member;

a first spring disposed in contact with said first support member and a second spring in contact with said second support member, said springs each having a restoring force which acts to pivot said support members downwardly so as to bring said pair of second rollers into contact with said first rollers with the filter member disposed therebetween; and means for causing said first support member to be pivoted upwardly against the restoring force of said first spring, the upward pivoting of said first support member causing said second support member to be pivoted upwardly due to contact of said plate with said second support member.

5. The mechanism recited in claim 4, said means for causing comprising a rod fixed to said first support member and a cam rotor disposed adjacent said rod, wherein, said cam rotor may be rotated to a position in which the outer surface of said rotor cams said rod upwardly so as to force said first support member upwardly against the restoring force of said first spring, and said rotor may be rotated to a position in which said cam rotor is out of contact with said rod such that said first support member moves downwardly due to the restoring force of said first spring.

6. The mechanism recited in claim 5 further comprising a motor including a shaft extending therefrom, said first rollers and said cam rotor disposed about said shaft, rotation of said shaft by said motor causing rotation of said first rollers and said cam rotor.

* * * * *